(12) United States Patent
Schlee

(10) Patent No.: US 7,725,350 B2
(45) Date of Patent: May 25, 2010

(54) PROMOTIONAL DATA DELIVERY SYSTEM AND METHOD

(75) Inventor: Daniel Roy Schlee, Moorpark, CA (US)

(73) Assignee: Daniel R. Schlee, Moorpark, CA (US)

( * ) Notice: Subject to any disclaimer, the term of this patent is extended or adjusted under 35 U.S.C. 154(b) by 1571 days.

(21) Appl. No.: 10/051,557

(22) Filed: Jan. 16, 2002

(65) Prior Publication Data

US 2002/0107739 A1 Aug. 8, 2002

Related U.S. Application Data

(60) Provisional application No. 60/266,515, filed on Feb. 5, 2001.

(51) Int. Cl.
G06F 17/30 (2006.01)
G06Q 30/00 (2006.01)

(52) U.S. Cl. .............. 705/14.49; 705/14.13; 705/14.23; 705/14.52; 705/14.55; 705/14.67

(58) Field of Classification Search .................... 705/14, 705/14.13, 14.23, 14.49, 14.52, 14.55, 14.67
See application file for complete search history.

(56) References Cited

U.S. PATENT DOCUMENTS

| 4,674,041 | A |   | 6/1987  | Lemon et al. |           |
|-----------|---|---|---------|--------------|-----------|
| 4,882,675 | A |   | 11/1989 | Nichtberger et al. |     |
| 4,908,761 | A | * | 3/1990  | Tai ................. | 705/14 |
| 5,488,423 | A | * | 1/1996  | Walkingshaw et al. ........ | 725/24 |
| 5,710,886 | A | * | 1/1998  | Christensen et al. .......... | 705/14 |
| 5,761,648 | A |   | 6/1998  | Golden et al. |          |
| 5,822,735 | A |   | 10/1998 | De Lapa et al. |         |
| 5,857,175 | A | * | 1/1999  | Day et al. ....................... | 705/14 |
| 5,905,246 | A | * | 5/1999  | Fajkowski ................... | 235/375 |
| 5,907,830 | A |   | 5/1999  | Engel et al. |           |
| 6,055,513 | A | * | 4/2000  | Katz et al. ..................... | 705/26 |
| 6,075,971 | A |   | 6/2000  | Williams et al. |        |
| 6,230,143 | B1 |  | 5/2001  | Simons et al. |         |
| 6,237,145 | B1 |  | 5/2001  | Narasimhan et al. |     |
| 6,249,772 | B1 |  | 6/2001  | Walker et al. |         |

(Continued)

FOREIGN PATENT DOCUMENTS

WO  WO 00/67092  11/2000

(Continued)

OTHER PUBLICATIONS

Perkins ("Air Options for Seniors." The Record, NJ: Dec. 3, 2000).*

(Continued)

Primary Examiner—Eric W Stamber
Assistant Examiner—Tri V Nguyen
(74) Attorney, Agent, or Firm—Hunton & Williams LLP

(57) ABSTRACT

A promotional data delivery system and method are disclosed by which promoters input to a host computing system their preferred consumer criteria and define their promotional materials, customers provide profiling information and select promotional materials, and a host relates the data pertaining to the promoters and customers to provide or otherwise communicate, preferably in tangible form such as paper via mail or parcel delivery services, promotional information including coupons particularly targeted for and/or selected by the prospective customers.

2 Claims, 3 Drawing Sheets

U.S. PATENT DOCUMENTS

| | | |
|---|---|---|
| 6,251,017 B1 | 6/2001 | Leason et al. |
| 6,282,516 B1 | 8/2001 | Giuliani |
| 6,282,713 B1 | 8/2001 | Kitsukawa et al. |
| 6,292,786 B1 | 9/2001 | Deaton et al. |
| 6,298,330 B1 | 10/2001 | Gardenswartz et al. |
| 6,298,348 B1 | 10/2001 | Eldering |
| 6,314,406 B1 | 11/2001 | O'Hagan et al. |
| 6,321,208 B1* | 11/2001 | Barnett et al. ............ 705/14 |
| 6,330,543 B1 | 12/2001 | Kepecs |
| 6,336,098 B1 | 1/2002 | Fortenberry et al. |
| 6,336,099 B1 | 1/2002 | Barnett et al. |
| 6,385,591 B1* | 5/2002 | Mankoff ............ 705/14 |
| 6,820,062 B1* | 11/2004 | Gupta et al. ............ 705/16 |
| 2001/0013011 A1 | 8/2001 | Day et al. |
| 2001/0042008 A1* | 11/2001 | Hull et al. ............ 705/14 |
| 2001/0049624 A1* | 12/2001 | Uyama et al. ............ 705/14 |
| 2001/0049627 A1* | 12/2001 | Simpson ............ 705/14 |
| 2002/0026359 A1 | 2/2002 | Long et al. |
| 2002/0178051 A1* | 11/2002 | Golden et al. ............ 705/14 |
| 2004/0220854 A1* | 11/2004 | Postrel ............ 705/14 |

FOREIGN PATENT DOCUMENTS

| | | |
|---|---|---|
| WO | WO 01/61597 | 8/2001 |
| WO | WO 01/63507 | 8/2001 |

OTHER PUBLICATIONS

Conner ("Picking up the perks." Northwest Florida Daily News. Fort Walton Beach, Fla.: Oct. 8, 2000).*

Mattson ("Discounts make retirement travel easier." Richmond Times—Dispatch. Richmond, VA: Sep. 21, 1986).*

GMA. "GMA, Joint Industry Coupon Commttee Unveil Comprehensive New Report on Couponing; Study Offers Key Learnings, Voluntary Guidelines to Make Process More Efficient, Effective." Jan. 9, 1998, GMA website: http://www.gmabrands.org/news/docs/NewsRelease.cfm?DocID=133.*

Ewoldt. "Clip & Save these tips." Chicago Sun—Times, Apr. 18, 1999 p. 47.*

* cited by examiner

PROMOTIONAL DATA DELIVERY SYSTEM AND METHOD

CROSS-REFERENCE TO RELATED APPLICATION

This application claims the benefit of U.S. Provisional Application No. 60/266,515 filed Feb. 5, 2001, the contents of which are hereby incorporated by reference.

BACKGROUND

1. Field of the Invention

This invention relates generally to promotional data delivery systems and methods and particularly to a system and method whereby a host, consumers and promoters are in communication for the purposes of distributing promotional data to targeted consumers.

2. Description of the Prior Art

Promotional material delivery systems generally and, coupon distribution systems in particular, are a common part of the American consumer field. Whether broadcast delivery via newspaper inserts or weekly mailers or targeted delivery via point-of-sale printing based on a last purchased item or via electronic coupons based on a last contacted website or e-commerce purchase, the field has yet to efficiently relate manufacturing and retailing promoters with desirous and receptive prospective customers in a dynamic and secure fashion.

Generally, manufacturers and retailers issue coupons to increase sales, reduce inventory and enhance brand loyalty. While coupons are delivered to consumers through a variety of media, the majority of coupons are distributed via pull-out sections in newspapers, which are also known as free-standing inserts. Although it is the most common means of coupon delivery, of those coupons distributed via free-standing inserts, only a very small percentage (2%) are redeemed. Other methods of distribution that often experience redemption rates higher than free-standing inserts include in-store shelf coupon dispensers, check-out or point-of-sale coupons, register receipt coupons, in-product coupons, instant peel-off on-product coupons and direct mail coupons.

Manufacturers and retailers expend significant resources on a cost-per-redeemed-coupon basis using existing systems. Participative consumers spend significant time in coupon management and usage. There remains a need for a system and method of promotional data delivery that concurrently allows manufacturers and retailers to target consumers that are likely to be desirous of the promotional material and likely to use the material when received, to reduce the consumer time wasted in repeated hunting, selecting, sorting, and gleaning of coupons as they manage and apply their coupon portfolio, and to require minimal changes in retailers' business practice to implement.

U.S. Pat. No. 5,907,830 to Engel et al. discloses an electronic coupon distribution system providing on-line coupon information for a potential consumer, using a personal computer connected to a host computer, thereby to search and select available coupons and download and securely print the selected coupons with a printer connected to the potential consumer's personal computer. An alternative embodiment has the host computer recording information obtained from the potential consumer for marketing purposes. Engle further discloses the system may automatically direct coupons satisfying the potential consumer's preferences to the consumer when the coupons become available. The invention discloses that by using information provided by the potential consumer and the requests consumers make for coupons, a mailing list may be compiled.

U.S. Pat. No. 6,237,145 to Narasimhan, et al. discloses a system for accessing and displaying promotional information and for generating redeemable coupons based on at least one of the accessed promoting stores' promotional information records, each of which includes an electronic coupon offer and information in connection with a product or service a merchant offers. The system also stores a customer profile for a system user that includes user preference information. The stored records are presented according to a hierarchical menu structure. The user navigates menus to select promotional information records for presentation. The user electronically clips the coupon offer of the presented record and the electronic clipped coupon is stored. At the merchant, the electronic clipped coupon is accessed and reviewed, and a paper coupon corresponding to the electronic clipped coupon is selectively generated for redemption by the merchant.

U.S. Pat. No. 6,321,208 to Barnett, et al. discloses a method and system similar to Engel with coupons selected in bulk for downloading by the user's personal computer and printing from the downloaded file selected coupons on a printer connected to the user's personal computer. An online service provider conceptually takes the place of Engel's host computer.

While the prior art summarized above attempts to provide efficient coupon delivery systems and methods in their own right, they do not permit the detailed consumer targeting of the coupon-using consumer by the manufacturers and retailers, and do not exploit the customer friendly secure means of coupon delivery via mail and other parcel delivery services.

An object of the present invention is the relating of promoters' promotion data with consumer data and thereby providing promotional data to customers likely to act on the received promotional data via secure and customerfriendly means such as postal delivery. An additional object of the present invention is to allow a participating manufacturer to select criteria in detail sufficient enough to support the screening of the types of prospective customers it wishes to receive its coupons or other promotional material. An additional object of the present invention is to track successive coupon distributions to minimize the targeted prospective customers receipt of duplicate coupons. An additional object of the present invention is that while the prospective customer has active roles in entering demographic data and selecting coupons, the customer will be sent coupons resulting from relational processing by the host computer of the manufacturers' and retailer's inputs with those of the receiving customer.

SUMMARY

The present invention provides a system and method by which promoters can stipulate their preferred customer criteria, customers can provide profiling information and the host can relate the promoters' and customers' data to provide or otherwise communicate, preferably in tangible form such as paper via mail or parcel delivery services, promotional information including coupons particularly targeted for the prospective customers. In practicing the present invention, manufacturers and retailers select their respective target audiences from the host's database of consumer data. In practicing the present invention, the customers subscribe to the services of the host by submitting a demographic profile and may select to receive particular coupons. Also in practicing the present invention, the promoters participate by authorizing and submitting promotional data parameters, and can select and prioritize consumer data as a targeted audience. The host may also obtain consumer data by other means including third-party surveys. The host relates the promotional data directions of the promoters with the consumer data, and thereby provides the resulting promotional data to the customer. The means of communication can be varied including postal service or other parcel delivery services, telefacsimile, wireless transmission, the Internet, or other means.

An advantage of the present invention includes efficiently directed promotional material delivered to receptive customers in a secure distributed system requiring minimal changes in the retailers' business practices in order to implement. An additional advantage of the present invention is that it minimizes manufacturers' coupon fraud by using physical delivery systems instead of exclusively printing at the sites of targeted customers. An additional advantage of the present invention is the process of receiving and relating demographic data, purchase history, product preferences and other data provided by the participating customers to efficiently reach the targeted audience to maximize rates of redemption.

DETAILED DESCRIPTION OF THE PREFERRED EMBODIMENT

Figure 1:
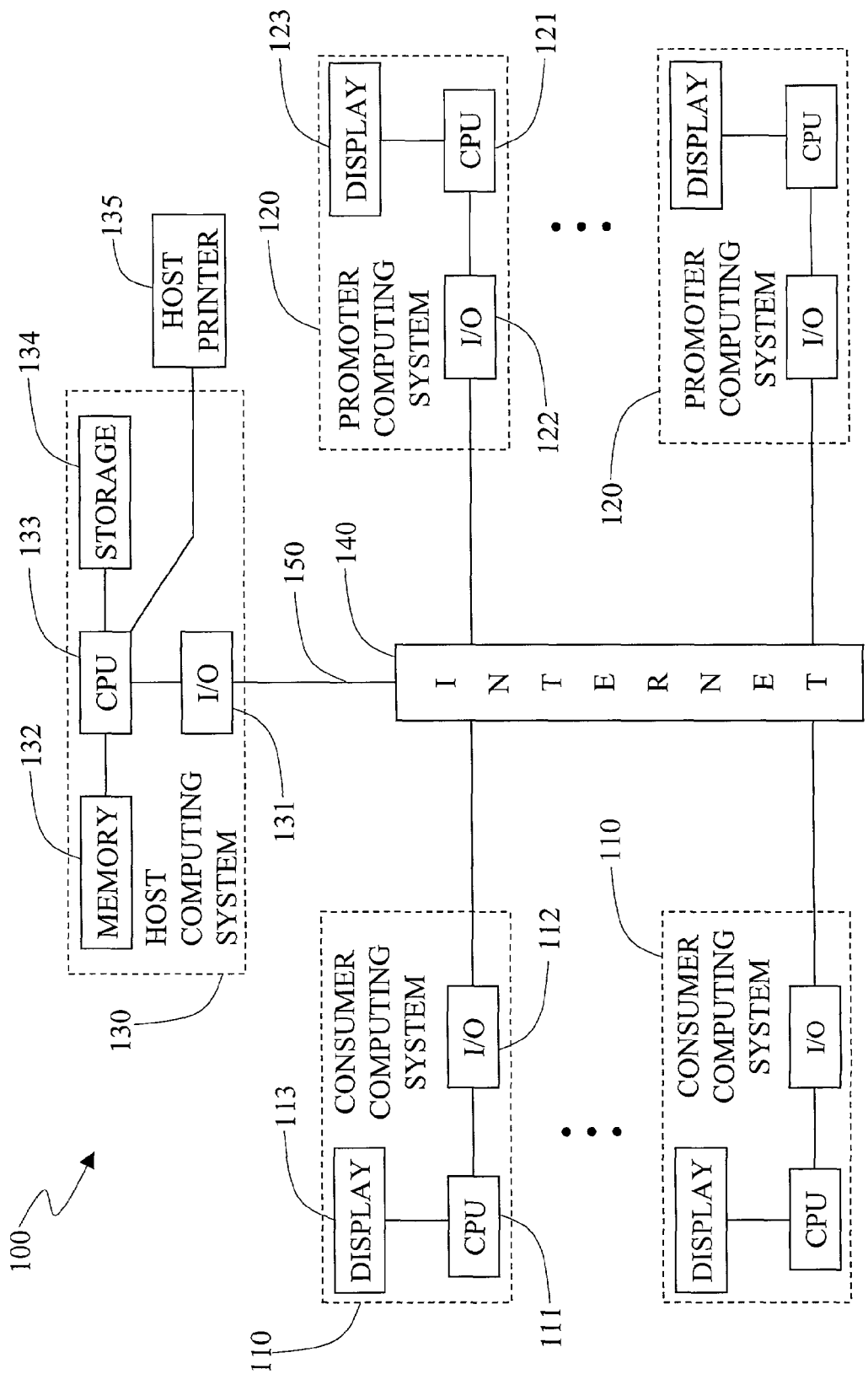
FIG. 1 illustrates a functional block diagram of the promotional data distribution system of the present invention.

In order to practice the present invention, the customers subscribe to the services of the host by submitting a demographic profile and in addition the host may obtain consumer data by any other means. The promoters participate by authorizing and submitting promotional data parameters and can select and prioritize consumer data as a targeted audience. The host relates the promoters' promotional data criteria with the customers' data, and thereby provides the resulting promotional data to the customer. The means of communication can be varied including postal service or other parcel delivery services, telefacsimile, wireless transmission, the Internet, or other means. The preferred embodiment of the present invention uses a distributed network, such as the Internet, with the means of secure delivery of coupons being paper coupons delivered by first class mail or other means acceptable to the promoter. Illustrated in FIG. 1 is the promotional data distribution system 100 of the present invention including a host, consumers and promoters that are in electrical communication via a distributed network such as the Internet 140. The host is represented by a general purpose computing system 130 for storing the Promotional Data Delivery system software and processing the input and output requests of both consumers and promoters. The host computing system comprises a central processing unit, CPU 133, that provides the primary processing functionality for the management system of the present invention. The CPU 133 is coupled to memory 132, which may include random access memory or read only memory, as well as non-volatile memory 134 such as disk storage or equivalent means of retaining information in computer readable form. Host computer system input and output 150 to the Internet 140 are provided by the input/output (I/O) device 131 that preferably includes connecting means with high capacity data transfer rates such as a T1 connection, for example, and can include one or more digital subscriber lines (DSLs), one or more dial-up or cable modems, and wireless connections. One or more host printing devices 135 are electronically accessible by the host computing system 130 for generating promotional materials. The host printing devices are secured such that the host computing system 130 has exclusive access to the host printing devices 135.

The host computing system 130 is accessible by consumers each having a general-purpose computer 110 as illustrated. The computer 110 may be desktop, laptop, personal digital assistant (PDA), mobile phone or an Internet-enabled appliance or the equivalent. The computer 110 supports standard communication protocols comprising Hypertext Transfer Protocol (HTTP), Multipurpose Internet Mail Extensions (MIME), Transmission Control Protocol/Internet Protocol (TCP/IP), and Mobile IP. The CPU 111 also provides the functional support for an Internet browser or other type of graphical user interface (GUI) at the consumer display 113, a computer monitor for example, through which the consumer interacts with the host computer. The computer uses Internet browsers. Typical Internet browsers operable with the computer 110 include products sold under the trademarks of MICROSOFT® INTERNET EXPLORER®, NETSCAPE® and MOSAIC®. The I/O 112 may include a keyboard, a pointing device (e.g., a mouse, a track ball, a pen device, or the like) as well as the hardware and software necessary to support communication between the consumer and the Internet, and may include a conventional dial-up modem, cable modem, digital subscriber line (DSL) or wireless interface in conjunction with an Internet service provider. The browser typically provides a GUI having a pointer that may be maneuvered about a screen to select various graphical icons to invoke features of the Internet browser. The graphical icons may represent, for example, hyperlinks to various uniform resource locators (URL) or pull down menus, such as a file menu or a bookmark menu, for interfacing with the Internet and the Internet browser. The one or more consumer computing systems may also have electronic access to printing devices.

The host computing system 130 is also accessible by one or more promoters with a computing system such as the general-purpose computer 120 illustrated. A promoter refers generally to a promoter, a manufacturer, a retailer, a brand name, a vendor or a supplier of goods or services for which consumers may request, solicit, order or otherwise receive promotional materials including coupons, discounts, mail-in rebates, sweepstakes, giveaways, or any other data promoting the promoter or its products. The computer 120 supports standard communication protocols such as HTTP, MIME, TCP/IP, and Mobile IP. The CPU 121 also provides the primary functional support for an Internet browser or other type of GUI at vendor display 123, a computer monitor or equivalent, through which the vendor interacts with the host computer 130. The computer uses Internet browsers. Typical Internet browsers operable with the CPU 121 include products sold under the trademarks of MICROSOFT® INTERNET EXPLORER®, NETSCAPE® and MOSAIC®. The I/O 122 includes the hardware and software necessary to support communication between the consumer computer and the Internet, and may include a conventional modem, cable modem, DSL or wireless interface in conjunction with an Internet service provider. The one or more promoter computing systems may also have electronic access to printing devices.

Figure 2:
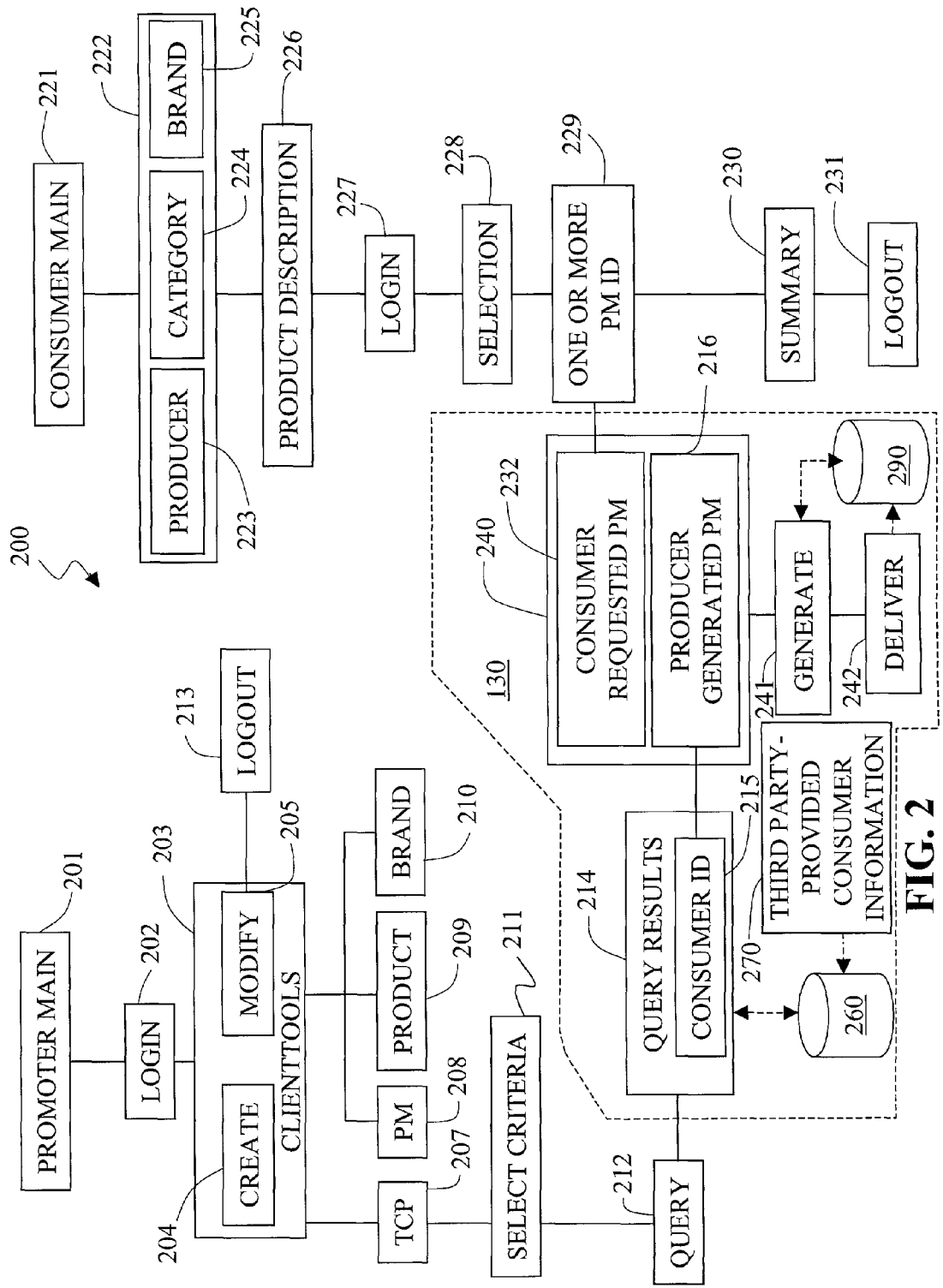
FIG. 2 illustrates a flowchart of the present invention.

Referring to the flowchart of FIG. 2, the Promotional Data Delivery system of the present invention, including distinct interfaces for both promoters and consumers, is illustrated. From the promoter computer, a promoter accesses the host computer system by promoter interfacing means including a secure, password-protected web page referred to as the promoter main page 201. From the promoter main page 201 the promoter provides identifying information such as account number and password to login 202 to the individual promoter's interface. Upon logging in, the promoter is presented with the defining means and inputting means of "ClientTools" 203, or HyperText Markup Language (HTML) links, through which the promoter may initially define, edit or modify information stored at the host computer. In the preferred embodiment, all downloads from the host computer system 130, including those that support the input of information, are preferably constructed in the form of HTML documents and forms, and provided to the vendor or consumer over the World-Wide Web (WWW) using HTTP.

Using the ClientTools 203 is, in the preferred embodiment, the primary hub through which the promoter is provided access to create 204 and modify 205 each of the functional elements necessary to define or edit Targeted Consumer Profiles (TCP) 207, promotional materials (PM) 208, products 209, brand name items 210, and other data. The information of the TCP 207, PM 208, products 209, brands 210 and other data are stored to and retrieved from the host computer and subsequently used to provide content for the consumer interface as well as promotional materials to be delivered to the consumer.

The ClientTools 203 may further comprise defining means for a promoter to input additional information, including:
1. choice of distributing a coupon, discount, mail-in rebates, sweepstakes, giveaway, or any other data promoting the promoter or its products;
2. Text/images regarding the promoter;
3. Promoter's assigned UCC code;
4. Text/images regarding each unique product;
5. Unique Product UCC code;
6. Text regarding product Ingredients;
7. Nutritional Facts data;
8. Brand names;
9. Product description;
10. Product size (US standard measurement, metric, quantity);
11. Products associated with a coupon;
12. Zip Code Regions where data will be delivered (currently 100, the first 2 digits of U.S. ZIP Codes, but this could be expanded to exact 5-digit ZIP Codes, ZIP+4 and the like);
13. Value of a coupon can have a unique value assigned for a Zip Code Region;
14. Maximum value that can be placed on the coupon (for situations where the value code does not have a specific "cents-off" amount);
15. Coupon Family Code;
16. Coupon Offer Code;
17. "DO NOT DOUBLE" (yes/no)
18. Indication whether the coupon is a "Manufacturer Coupon" or "Military Coupon."; and
19. Other items requested by the promoter.

The promoter, upon finishing all necessary work with the ClientTools 203 in this session, can Logout 213 from the main menu.

All activity performed with the ClientTools 203, including Login 202 and Logout 213, are recorded in the host database 260, along with the Modifier's unique ID. This provides a factual history of activity and can be used to confirm what changes were made, when the changes were made, and who made the changes. Additionally, an email or other type of notification will also be generated automatically by transmission means and forwarded to the promoter, data entry person, or other interested party; this notification by the transmission means is an acknowledgement (receipt) of the activity.

The TCP 207 includes a subroutine for distributing the promotional materials to consumers that receive the PM 208 Promotional Data Delivery 200 as defined by the present invention. A promotion can be selected from the list of items previously defined at PM 208. The promoter is prompted to select consumer criteria and input information into the Selection Criteria 211 for the purpose of retrieving consumers who match the criteria. As part of the inputting means of Select Criteria 211, the promoter defines one or more criteria that must be met in order for a consumer to qualify to receive the promotional materials. Criteria may include but are not limited:
1. Gender;
2. Age;
3. Marital status;
4. Level of education;
5. Number and ages of children;
6. Household or personal income;
7. Residence (rent/own/other);
8. Type of pets in the household;
9. Shopping preferences;
10. Product preferences;
11. Brand preferences;
12. Shopping frequency;
13. City;
14. State;
15. Zip Code (in lieu of City/State);
16. Area code;
17. Phone extension number (first 3 digits of phone number);
18. Type of products owned (DVD, PDA, personal computer, and the like);
19. Other demographic items (no limit to number of items);
20. Other consumer preferences (no limit to number of items);
21. Consumer's shopping or purchase history; and
22. Other consumer data.

The Select Criteria 211 may further include (1) the minimum and maximum age of the targeted consumer, (2) the maximum number of recipients to be targeted, (3) duplication criteria to prevent consumers from receiving redundant promotional materials within a set period of time, (4) criteria priority settings for the purpose of prioritizing the rank or relationship of the criteria, and (5) any other data which may be beneficial in distributing promotional data from the promoter to the consumer.

A promoter uses querying means 212 to interrogate the relational database of database means 260. The query is conducted automatically and without the assistance or intervention of the promoter. The database means 260 includes a relational database that comprises all of the personal demographic and other information provided by the participating consumers as well as information of the participating consumers provided by third parties 270.

The establishing means takes the results of the query 214 to form a list of consumers to receive the promotional material specified in the TCP 207, the list including a representative consumer having a "consumer identification" 215. The promoter-generated promotional material 216 are then generated 241, either in printed or electronic form, and subsequently delivered 242 to the each of the consumers. That is, the promoter's promotional materials 216 may also be sent without the receiving consumer specifically requesting the promotional materials and the delivery interval may be intermittent or uniformly spaced, where the delivery characteristic may be defined by the consumer, host or promoter. The host 130 may use tracking means 290 including a relational database to track successive coupon distributions in order to minimize the targeted prospective customers receipt of duplicate coupons.

In addition to receiving the promotional materials subject to the criteria of the promoters, the consumer may also request, via interfacing means, specific promotional materials of interest from the promoters participating in the Promotional Data Delivery service. A consumer makes such a request by accessing the consumer main page 221, which is accessible from the consumer computer via the Internet. The host computer system consumer interfacing means includes various web pages, links, and forms 222, including means for viewing promotional material and product information categorized according to promoter name 223, item category 224 and product brand name 225. From the various pages, links, and search methods 222, a consumer can view product descriptions 226 retrieved from the host computer.

Figure 3:
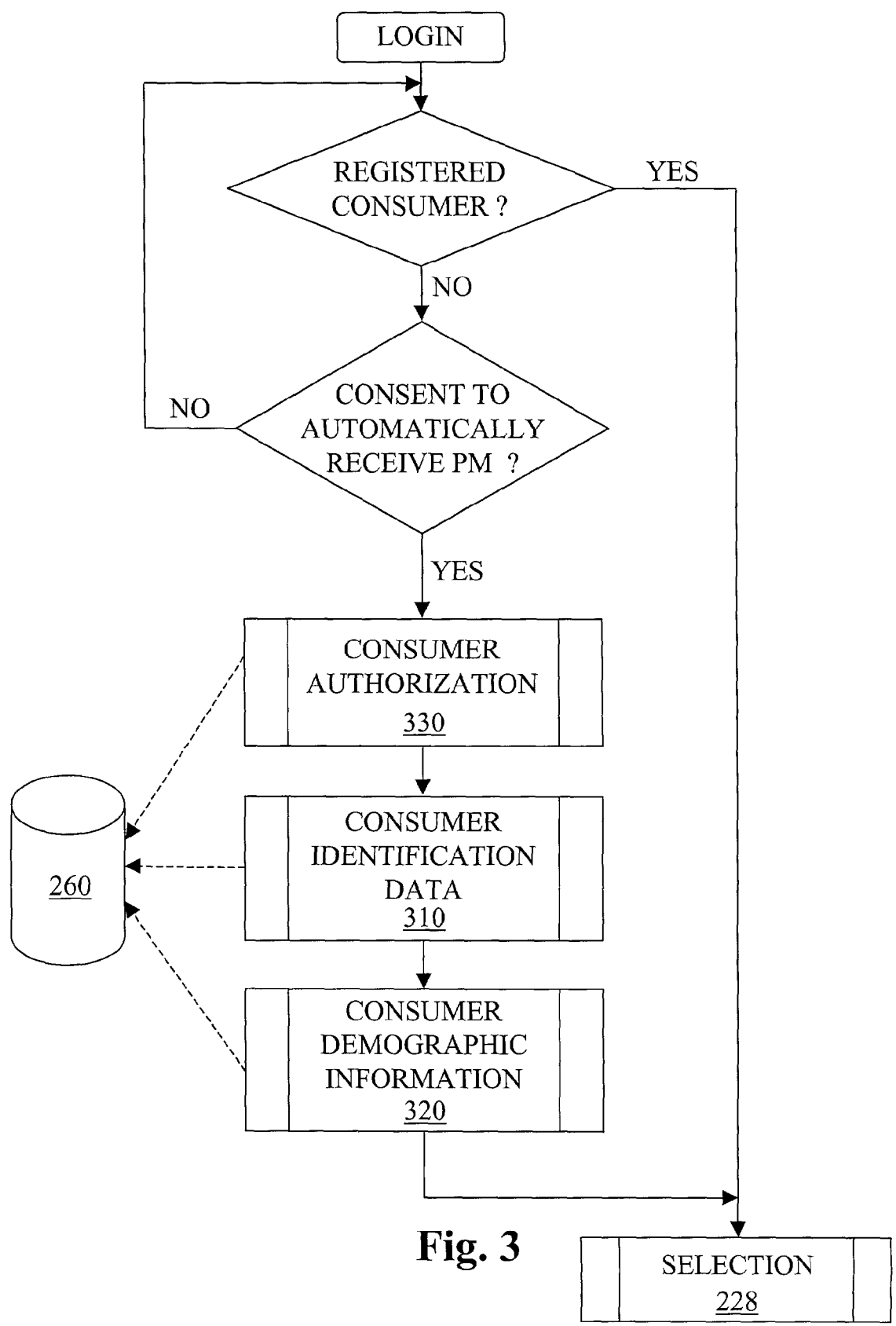
FIG. 3 illustrates a detailed flowchart of the customer login of the present invention.

The host system consumer interfacing means may also include registering means for the consumer to subscribe via registration or login 227. FIG. 3 illustrates the login procedure 227 in detail whereby the host computer 130 receives, in response to profiling queries, consumer identification data 310, consumer demographic information 320 and consumer authorization 330 to participate in the Promotional Data Delivery service. In the course of registering with the host, a consumer can affirmatively consent to receive one or more promoter-generated promotional materials without the consumer (1) contemporaneously requesting specific promotional materials and (2) necessarily authorizing each distribution of promotional materials on a per-transaction basis.

Returning to FIG. 2, it is after login that the consumer may then use selecting means 228 to request delivery of particular promotional materials predefined by the promoters at the PM 208. One or more selected promotional materials' identification numbers are then sent to the host computer 120 as consumer-requested promotional materials 232. Additionally, an email or other type of notification will also be generated automatically and forwarded to the promoter, data entry person, or other interested party; it will detail the data submitted in the Query 212, and is an acknowledgement (receipt) of the activity. An email or other type of notification may also be generated to display the Query Results 214.

The list of promotional materials requested by the consumer are preferably summarized 230 for the consumer and thereafter the consumer may logout 231. The consumerrequested promotional materials 232 are combined 240, if applicable, with any promoter-generated promotional material 216. The combination of promotional materials 240 is then collectively generated 241 and delivered 242 to the individual consumer. The combined promotional materials 260 each can include elements typically found in a coupon, such as:

1. coupon bar code;
2. extended bar code;
3. human-readable bar code;
4. offer code;
5. description of products required to be purchased;
6. value of coupon;
7. expiration date;
8. images;
9. legal text for the consumer;
10. legal text for the retailer;
11. consumer identification codes, including serial number and bar code representations of serial numbers, used by the promoter to assess individual purchasing habits, redemption rates and the effectiveness of the target profile; and
12. Any other data requested to be distributed by the promoter.

If printed by a host printing device, the promotional materials are mailed directly to the consumer while the electronic promotional materials may be transmitted by telefacsimile, web page, email, email attachment or equivalent means to the consumer for subsequent printing or redemption.

Alternative Embodiment

In an alternative embodiment, the promotional materials may be delivered 242 to a consumer in an electronic document (email, email attachment, web page, telefacsimile, and the like) on behalf of a retailer or the manufacturer of products sold by a retailer. A consumer in receipt of the electronic document can be: (a) within the retailer's geographic area; (b) a directed recipient of the retailer; or (c) in some other commercial connection between the retailer, manufacturer, consumer, and third party. The manufacturer has the ability to use interfacing means 203 to select consumer criteria 211 (e.g., demographics, shopping history, and the like) of the consumers best suited to receive their promotional data contained in the electronic document. Additionally, the manufacturer may authorize the one or more participating retailers to offer a purchase incentive to the targeted consumers. Terms of the purchase incentive are described in detail on the electronic document, and may include promotional text and images. Redemption of the manufacturer promotion must be performed at the retailer who is sponsoring the delivery of the electronic document to the consumer. The delivery means 242 of the alternative embodiment has a two-part delivery. That is, each consumer who receives the manufacturer's purchase incentive will also have an electronic representation of that offer reside in the retailer's database.

Also in the above alternative embodiment, the consumer is instructed to create a hardcopy printout of the electronic document, which will then be brought to the retailer. The printed document contains bar coding that is both unique to each consumer and readable by the retailer's point-of-sale scanner to identify the particular consumer. Upon scanning, the retailer's database can then associate this unique consumer to the offers delivered via the electronic document. For every match of products purchased and discount offered, the discount will be subtracted from the total point-of-sale purchase and the database will be updated to reflect the product purchased and the discount given. This information can then be transmitted to the manufacturer for reconciliation. In addition to manufacturer promotional data, the electronic document, as part of the query results 214, may also include retailerspecific promotional data, treated as an extension of the producer generated PM 216, including, but not limited to: details of the retailer's in-store promotions; beginning and end dates of in-store promotions; images of the items on sale; the retailer's corporate information; retail industry news; health and fitness news; recipes; shopping tips; and any other news or information the retailer desires to distribute to the consumer.

While certain exemplary embodiments have been described and shown in the accompanying drawings, it is to be understood that such embodiments are merely illustrative of and not restrictive on the broad invention. The scope of each claim term is not limited to the specific constructions and arrangements shown and described, since various other modifications may occur to those ordinarily skilled in the art.

Therefore, the invention has been disclosed by way of example and not limitation, and reference should be made to the following claims to determine the scope of the present invention.

The invention claimed is:

1. A method comprising the steps of:
(1) providing a database in a host computer system, comprising:
   A. retaining data for a plurality of consumers, comprising, for each consumer,
      I. retaining at least:
         1. consumer name data;
         2. consumer mailing address data;
         3. consumer email address data;
         4. consumer demographic data;
      II. obtaining data, and a source of the data, for each consumer, comprising at least one of:
         1. obtaining data from a third-party entity that is not a member of the host computer system, wherein the data for each consumer that is sourced from the third-party entity that is not a member of the host computer system, wherein obtaining the data from the third-party entity comprises at least one of:
            a. obtaining consumer data for the consumer that cannot connect to a network;
            b. obtaining consumer data for the consumer that does not have access to a computer;
            c. obtaining consumer data for the consumer that has no relationship with a member of the host computer system;
            d. obtaining consumer data for the consumer that has no itinerary or destination;
         2. obtaining data from a third-party entity that is a member of the host computer system;
         3. obtaining data from the consumer who voluntarily submits data to the host computer system via a host website;
   B. retaining data for a plurality of manufacturers, wherein each manufacturer is a member of the host computer system, and, at the direction of the manufacturer, the host computer system promotes the manufacturer by at least one of allowing manufacturer's data to be viewed by consumers at the host website, and generating and distributing manufacturer's data by the host computer system, wherein each manufacturer is a business that manufactures or packages tangible products intended for consumers, wherein each manufacturer creates and delivers products to businesses that maintain an inventory of the manufacturer's products, wherein the consumer may obtain the manufacturer's product from a business possessing the inventory, wherein the consumer transfers currency or equity representing currency to the business possessing the manufacturer's products in exchange for unencumbered ownership of the manufacturer's products, and wherein retaining data, for each manufacturer, comprises:
      I. retaining at least:
         1. manufacturer name data;
         2. data describing at least one of the manufacturer's products;
         3. data assigned to the manufacturer by a Uniform Code Council or its successor, comprising:
            a. retaining an identifier representing the manufacturer, wherein the identifier is required to create a manufacturer's coupon implementing a manufacturer coupon specification created by the Uniform Code Council or its successor;
            b. retaining, for each of the manufacturer's products, an identifier representing a product;
         4. data to generate and distribute a manufacturer's coupon by the host computer system on behalf of the manufacturer, wherein:
            a. retaining identifiers from the Uniform Code Council or its successor, comprises:
               i. retaining an identifier representing the manufacturer;
               ii. retaining an identifier representing all the products associated with the coupon offer;
               iii. retaining an identifier representing the value of the coupon;
            b. retaining data defined by the host computer system, comprises:
               i. retaining data to enable the printing of point-of-sale redemption instruction on the manufacturer's coupon, comprising at least one of:
                  (A) enabling a "Do Not Double" point-of-sale redemption instruction to be printed;
                  (B) enabling another point-of-sale redemption instruction to be printed;
               ii. retaining data to enable, when the host computer system-generated manufacturer's coupon is to be distributed specifically to U.S. military personnel and to be redeemed at a within a U.S. military base, printing of a phrase "Military Coupon" instead of a phrase "Manufacturer Coupon" on the manufacturer's coupon;
         5. retaining data to generate and distribute a mail-in rebate;
         6. retaining data to generate and distribute a sweepstakes;
         7. retaining data to generate and distribute a giveaway;
         8. retaining data to generate and distribute other methods to promote the manufacturer or its products;
   C. retaining data for a plurality of retailers, wherein each retailer is a member of the host computer system, and, at the direction of the retailer, the host computer system promotes the retailer by at least one of allowing retailer's data to be viewed by consumers at the host website, and generating and distributing retailer's data by the host computer system, wherein each retailer sells products or services to consumers in exchange for currency or equity representing currency, wherein retaining data, for each retailer, comprises:
      I. retaining at least:
         1. retailer name data;
         2. data describing at least one item for sale, comprising at least one of:
            a. data of at least one product in the retailer's inventory;
            b. data describing a service performed by the retailer;
      II. retaining data to generate and distribute a retailer's promotional materials by the host computer system on behalf of the retailer, comprising:
         1. retaining data to generate and distribute a retailer coupon;
         2. retaining data to generate and distribute a mail-in rebate;
         3. retaining data to generate and distribute a sweepstakes;
         4. retaining data to generate and distribute a giveaway;

5. retaining data to generate and distribute other methods to promote the retailer or its products or its services;

(2) providing a host website, comprising:

A. presenting manufacturer interactive data entry forms for the plurality of individual manufacturers, wherein the manufacturer interactive data entry forms are configured to receive a manufacturer's input and subsequently save data for each manufacturer into the database, wherein presenting manufacturer interactive data entry forms comprises:

I. presenting data entry forms for the manufacturer to enter manufacturer company and product information;

II. presenting data entry forms for the manufacturer to enter manufacturer promotional data, comprising:

1. presenting data entry forms for the generation and distribution a manufacturer's coupon on behalf of the manufacturer, comprising at least:
  a. presenting data entry forms for elements defined by the manufacturer coupon specification of the Uniform Code Council or its successor, comprising:
    i. presenting a data entry form to submit an identifier representing all products associated with a manufacturer's coupon;
    ii. presenting a data entry form to submit an identifier representing a value of a manufacturer's coupon;
  b. presenting data entry forms for elements defined by the host computer system, comprising:
    i. presenting a data entry form to submit a text description of a manufacturer's coupon offer;
    ii. presenting a data entry form to enable printing a point-of-sale redemption instruction on the manufacturer's coupon, comprising at least one of:
      (A) enabling a "Do Not Double" point-of-sale redemption instruction to be printed;
      (B) enabling another point-of-sale redemption instruction to be printed;
    iii. presenting a data entry form to enable, when the host-generated manufacturer's coupon is to be distributed specifically to U.S. military personnel and to be redeemed at a within a U.S. military base, printing of a phrase "Military Coupon" instead of a phrase "Manufacturer Coupon" on the manufacturer's coupon;
2. presenting data entry forms for the generation and distribution of a manufacturer's mail-in rebate;
3. presenting data entry forms for the generation and distribution of a manufacturer's sweepstakes;
4. presenting data entry forms for the generation and distribution of a manufacturer's giveaway;
5. presenting data entry forms for the generation and distribution of other manufacturer's promotional materials;

III. presenting data entry forms for the manufacturer to select criteria representing a manufacturer's targeted consumer profile, wherein the manufacturer's interaction with the criteria selection forms is independent of interaction by the consumer with the host computer system and the manufacturer and comprises:

1. presenting criteria selection forms to the manufacturer online;
2. accepting, from the data entry forms, the manufacturer's criteria selections, comprising:
  a. accepting demographic criteria selections of manufacturer's targeted consumers;
  b. accepting geographic criteria selections of manufacturer's targeted consumers;
  c. accepting dates that the manufacturer requires the host computer system to generate and distribute the manufacturer's promotional materials;
  d. accepting one or more types of promotional material to be generated and distributed by the host computer system, the one or more types of promotional material comprising:
    i. a manufacturer's coupon promotional material;
    ii. mail-in rebate promotional material;
    iii. sweepstakes promotional material;
    iv. giveaway promotional material;
    v. other promotional material promoting the manufacturer or its products;
  e. accepting one or more methods of promotional material delivery, the one or more methods of promotional material delivery comprising a least one of:
    i. print then mail;
    ii. email;
    iii. email attachment;
    iv. webpage;
    v. fax;
3. converting, by the host computer system, all form data into a query;
4. displaying, by the host computer system, results of the query, wherein the results comprise one or more of a plurality of ConsumerIDs, wherein each ConsumerID represents an individual consumer's data in the database;
5. saving to the database, by the host computer system, one or more records, wherein each record comprises at least:
  a. one ConsumerID;
  b. one identifier representing the manufacturer's promotional materials;
  c. one or more dates, selected by the manufacturer, that the manufacturer's promotional materials may be generated and distributed by the host computer system;
  d. one or more methods of promotional material delivery, selected by the manufacturer, to be performed by the host computer system to the consumer;

IV. presenting data entry forms for the manufacturer to enter data, wherein the manufacturer's interaction with these forms is independent of interaction by the consumer with the host computer system and the manufacturer, wherein presenting the data entry forms comprises:

1. presenting data entry forms to allow the manufacturer to disable a display of the manufacturer's promotional materials to one or more consumers,
2. presenting data entry forms to allow the manufacturer to disable the generation and distribution by the host computer system of the manufacturer's promotional materials to one or more consumers;

B. presenting retailer interactive data entry forms for the plurality of retailers, wherein the retailer interactive data entry forms are configured to receive a retailer's input and subsequently save data for each retailer into the database, wherein presenting retailer interactive data entry forms comprises:

I. presenting data entry forms for the retailer to enter retailer company data, comprising one or more of:
   1. presenting data entry forms for the retailer's to enter product inventory data;
   2. presenting data entry forms for the retailer to enter data describing services provided by the retailer;
II. presenting data entry forms for the retailer to enter retailer promotional data, comprising:
   1. presenting data entry forms for the generation and distribution of a retailer coupon;
   2. presenting data entry forms for the generation and distribution of a retailer mail-in rebate data;
   3. presenting data entry forms for the generation and distribution of a retailer sweepstakes data;
   4. presenting data entry forms for the generation and distribution of a retailer giveaway data;
   5. presenting data entry forms for the generation and distribution of other data promoting the retailer or its products, inventory, and services;
III. presenting retailer data entry forms to select criteria representing a retailer's targeted consumer profile, wherein the retailer's interaction with the criteria selection forms is independent of interaction by the consumer with the host computer system and the retailer and comprises:
   1. presenting criteria selection forms to the retailer online;
   2. accepting, from the data entry forms, a retailer's criteria selections, comprising:
      a. accepting demographic criteria selections of retailer's targeted consumers;
      b. accepting geographic criteria selections of retailer's targeted consumers;
      c. accepting dates that the retailer requires the host-computer system to generate and distribute the retailer's promotional materials;
      d. accepting one or more types of promotional material to be generated and distributed by the host computer system, the one or more types of promotional material comprising:
         i. a retailer's coupon promotional material;
         ii. mail-in rebate promotional material;
         iii. sweepstakes promotional material;
         iv. giveaway promotional material;
         v. other promotional material promoting the retailer or its products;
      e. accepting one or more methods of promotional material delivery, the one or more methods of promotional material delivery comprising a least one of:
         i. print then mail;
         ii. email;
         iii. email attachment;
         iv. webpage;
         v. fax;
   3. converting, by the host computer system, all form data into a query;
   4. displaying, by the host computer system, results of the query, wherein the results comprise one or more of a plurality of ConsumerIDs, wherein each ConsumerID represents an individual consumer's data in the database;
   5. saving to the database, by the host computer system, one or more records, wherein each record comprises at least:
      a. one ConsumerID;
      b. one identifier representing the retailer's promotional materials;
      c. one or more dates, selected by the retailer, that the retailer's promotional materials may be generated and distributed by the host computer system;
      d. one or more methods of promotional material delivery, selected by the retailer, to be performed by the host computer system to the consumer;
IV. presenting data entry forms for the retailer to enter data, wherein the retailer's interaction with the forms is independent of interaction by the consumer with the host computer system and the retailer, wherein presenting the data entry forms comprises:
   1. presenting data entry forms to allow the retailer to disable a display of the retailer's promotional materials to one or more consumers;
   2. presenting data entry forms to allow the retailer to disable the generation and distribution by the host computer system of the retailer's promotional materials to one or more consumers;
C. presenting consumer interactive data entry forms and links for the plurality of consumers, wherein the consumer interactive data entry forms and links are configured to receive and subsequently save data for each consumer into the database, wherein presenting the consumer interactive data entry forms and links comprises:
   I. presenting data entry forms for the consumer to enter consumer contact and demographic information;
   II. presenting links for the consumer to activate to invoke search methods for finding data that the consumer is seeking, comprising at least:
      1. presenting a link to invoke a manufacturer search;
      2. presenting a link to invoke a retailer search;
      3. presenting a link to invoke a brand name search:
      4. presenting a link to invoke a product category search;
   III. presenting a data entry form for the consumer to enter text, wherein the host computer system will perform a search based upon the consumer-entered text throughout the database and return results of the textual search;
   IV. presenting links for the consumer to activate to invoke a display of data comprising:
      1. presenting a link to invoke a manufacturer's company data;
      2. presenting a link to invoke a manufacturer's product data;
      3. presenting a link to invoke a manufacturer's product ingredients data;
      4. presenting a link to invoke a manufacturer's product nutritional facts data;
      5. presenting a link to invoke a retailer's company and contact information data;
      6. presenting a link to invoke a retailer's inventory data;
   V. presenting data entry forms to select displayed promotional materials from associated manufacturers and retailers, wherein selection of the displayed promotional materials by the consumer will cause the host computer system to generate and distribute the selected promotional materials on behalf of the associated manufacturers and retailers, wherein:
      1. a manufacturer's promotional materials may be distributed independent of a manufacturer's preferred consumer profile;

2. a retailer's promotional materials may be distributed independent of a retailer's preferred consumer profile;
3. the selected promotional materials may be distributed independent of a consumer's profile;

(3) providing a host printer to convert data from the database into printed promotional materials, comprising the steps:

A. performing queries to the database, solely by the host computer system, for each consumer in the database, to retrieve previously saved records, wherein the records returned by each query identify one ConsumerID, wherein a ConsumerID represents one consumer, wherein the identified consumer will be the recipient of printed promotional materials from the host computer system on behalf of one or more manufacturers and retailers, wherein performing queries to the database comprises:

I. creating query parameters not involving data regarding a consumer's destination or itinerary;

II. obtaining results of queries for one consumer, represented by a ConsumerID, comprising the steps of:

1. obtaining results from a query, from the plurality of manufacturers who created one or more targeted consumer profiles, in the form of one or more records identifying one ConsumerID, wherein data from each record comprises:
   i. one ConsumerID;
   ii. one identifier that represents the manufacturer's promotional materials;
   iii. one or more dates that the manufacturer has approved for the host computer system to generate and distribute the manufacturer's promotional materials, wherein the date the query is performed matches one of the manufacturer's approved distribution dates;

2. obtaining results from a query, from the plurality of retailers who created one or more targeted consumer profiles, in the form of one or more records identifying one ConsumerID, wherein data from each record comprises:
   i. one ConsumerID;
   ii. one identifier that represents the retailer's promotional material;
   iii. one or more dates that the retailer has approved for the host computer system to generate and distribute the retailer's promotional material, wherein the date the query is performed matches one of the retailer's approved distribution dates;

3. obtaining results from a query in the form of one or more records in the database identifying manufacturer and retailer promotional materials selected by the consumer that have not yet been delivered by the host computer system to the consumer, wherein obtaining results from the query comprises:
   a. obtaining data from each record, wherein data from each record comprises:
      i. one ConsumerID;
      ii. one identifier that represents promotional materials created by the manufacturer or retailer in the host computer system;
      iii. one or more dates that the retailer has approved for the host computer system to generate and distribute the retailer's promotional material, wherein the date the query is performed matches one of the retailer's approved distribution dates;
      iv. obtaining, for promotional material that is a coupon, consumer identification codes data to identify this specific coupon to be sent to this specific consumer;
   b. distributing a manufacturer's promotional materials to a consumer may be performed independent of a manufacturer's preferred consumer profile;
   c. distributing a retailer's promotional materials to a consumer may be performed independent of a retailer's preferred consumer profile;
   d. distributing promotional materials may be performed independent of the consumer's profile;

4. combining results obtained from queries into one combined set of records representing all promotional materials to be printed for one consumer at a single time;

5. retrieving data, required to print promotional materials of the combined set of records, from the database, wherein the data is received by a host printer, wherein data required to print a manufacturer's coupon is available only to the host computer system, wherein the data is not distributed to any entity or device outside the host computer system;

6. printing the promotional materials, comprising:
   a. printing promotional materials on behalf of one or more manufacturers, comprising:
      i. printing a manufacturer's coupon, comprising at least:
         (A) printing data, defined by the manufacturer coupon specification of the Uniform Code Council or its successor, comprising:
            1st. printing an identifier representing the manufacturer;
            2nd. printing an identifier representing all products associated with the manufacturer's coupons;
            3rd. printing an identifier representing a value of the manufacturer's coupon;
            4th. printing an identifier representing consumer identification codes data;
         (B) printing elements, defined by the host computer system, comprising at least one of:
            1st. printing consumer identification codes data that may include serial numbers;
            2nd. printing, if enabled, a point-of-sale redemption instruction on the manufacturer's coupon, comprising:
               One. printing a "Do Not Double" point-of-sale redemption instruction;
               Two. printing another point-of-sale redemption instruction;
            3rd. printing, if enabled, a phrase "Military Coupon" instead of a phrase "Manufacturer Coupon" on the manufacturer's coupon;
      ii. printing a manufacturer's mail-in rebate data;
      iii. printing a manufacturer's sweepstakes data;
      iv. printing a manufacturer's giveaway data;
      v. printing other promotional materials promoting the manufacturer or its products;
   b. printing promotional materials on behalf of one or more retailers, comprising:
      i. printing a retailer's coupons, comprising at least:
         (A) printing the retailer's name;
         (B) printing terms of the retailer's coupon;
         (C) printing consumer identification codes data that may include serial numbers;
      ii. printing a retailer's mail-in rebates data;

iii. printing a retailer's sweepstakes data;
iv. printing a retailer's giveaway data;
v. printing other promotional materials promoting the retailer or its inventory or products or services;

(4) distributing promotional materials generated by the host computer system to a specific consumer on behalf of one or more manufacturers and retailers, the promotional materials comprising coupons, mail-in rebates, sweepstakes, giveaways, and other materials promoting the manufacturers and retailers and their products, wherein distributing the promotional materials comprises:

A. distributing promotional materials printed by the host computer system, comprising
    I. inserting, into an envelope, individual promotional materials printed by the host printer, comprising at least one of:
      1. inserting, into an envelope, one or more promotional materials from one or more manufacturers in which, for each individual promotional material printed, each manufacturer has chosen a particular consumer to be a recipient of its printed promotional materials, wherein:
        a. the distribution of promotional materials by the host computer system on behalf of each manufacturer is solely determined by each manufacturer;
        b. the distribution of promotional materials from each manufacturer is independent of interaction from the consumer or a consumer's representative;
      2. inserting, into an envelope, one or more promotional materials from one or more manufacturers, selected by the consumer at the host website, wherein the manufacturer of each selected promotional material has independently directed the host computer system to print the selected promotional materials;
      3. inserting, into an envelope, one or more promotional materials from one or more retailers which have selected the consumer, independent of any interaction from the consumer or a consumer's representative, to be a recipient of its printed promotional materials, wherein:
        a. the distribution of promotional materials by the host computer system on behalf of each retailer is solely determined by each retailer;
        b. the distribution of promotional materials from each retailer is independent of interaction from the consumer or a consumer's representative;
      4. inserting, into an envelope, one or more promotional materials, from one or more retailers, selected by the consumer at the host website, wherein the retailer of each selected promotional material has independently directed the host computer system to print the selected promotional materials;
    II. finishing the envelope with postage and mailing address;
    III. delivering, via U.S. Postal Service or other courier delivery, the envelope of promotional materials to the consumer for whom the set of printed promotional materials was generated;
  B. distributing electronic promotional materials via email, email attachment, webpage, fax or other electronic means, comprising at least one of:
    I. distributing one or more promotional materials from one or more manufacturers in which, for each individual promotional material, each manufacturer has chosen this consumer to be a recipient of its electronic promotional material, and
      1. the distribution of promotional material by the host on behalf of each of these manufacturers is solely determined by each manufacturer, and
      2. the distribution of promotional material from these manufacturers is independent of interaction from the consumer or consumer's representative, and
      3. containing, if a promotional material is a manufacturer's coupon, a consumer identification codes data; and
    II. distributing one or more promotional materials, from one or more manufacturers, selected by this consumer at the host website, and the manufacturer of each selected promotion has independently directed the host to print the selected promotion, and
    III. distributing one or more promotional materials from one or more retailers in which each retailer has chosen this consumer, independent of any interaction from the consumer or consumer's representative, to be a recipient of its printed promotional materials, and
      1. the distribution of promotional material by the host on behalf of each of these retailers is solely determined by each retailer, and
      2. the distribution of promotional material from these retailers is independent of interaction from the consumer or consumer's representative, and
      3. containing, if a promotional material is a retailer's coupon, a consumer identification codes data; and
    IV. distributing one or more promotional materials, from one or more retailers, selected by this consumer at the host website, and the retailer of each selected promotion has independently directed the host to print the selected promotion; and (5) providing a tracking mechanism, performed after the consumer redeems a host computer system-generated coupon, comprising the steps of:
  A. performing a coupon tracking process of the manufacturer's coupon that was generated by the host computer system on behalf of the manufacturer, subsequently distributed by the host computer system to the consumer, and subsequently provided value to the consumer by redeeming the manufacturer's coupon at a manufacturer coupon redeemer, wherein the consumer transfers possession of the host computer system-generated manufacturer's coupon to the manufacturer coupon redeemer, wherein the manufacturer coupon redeemer seeks reimbursement of the value the manufacturer coupon redeemer provided to the consumer at a manufacturer coupon redeemer's point-of-sale, wherein the coupon tracking process comprises:
    I. submitting consumer identification codes data printed on the host computer system-generated manufacturer's coupon to the database by an entity that possesses the redeemed coupon, comprising:
      1. submitting by the manufacturer coupon redeemer or a manufacturer coupon redeemer's representative;
      2. submitting by the manufacturer or a manufacturer's representative;
      3. submitting by the host computer system;
    II. comparing data on the coupon with data retained in the database, comprising:

1. saving submitted data where there is a successful match of the submitted host computer system-generated manufacturer's coupon's consumer identification codes data to consumer identification codes data retained in the database, wherein the saved data provides direct association with the consumer who originally received the coupon, wherein the saved data and direct association may be reported by:
   a. reporting the promotional data input by the manufacturer;
   b. reporting a ConsumerID, wherein the ConsumerID is directly associated with all data pertaining to the consumer who was assigned the ConsumerID by the host computer system;
   c. reporting the date that the host computer system-generated manufacturer's coupon was generated and distributed;
   d. reporting the date that the host computer system-generated manufacturer's coupon's consumer identification codes data was submitted to the host computer system after redemption;
   e. reporting the manufacturer coupon redeemer where the consumer redeemed the host computer system-generated manufacturer's coupon;
2. saving submitted data where there is an unsuccessful match, or subsequent multiple match, of consumer identification codes data to the database, wherein the saved data may be investigated for potential coupon fraud activity;

III. wherein the manufacturer coupon redeemer is a business that maintains an inventory of products from a variety of manufacturers, wherein the manufacturer coupon redeemer has an inventory of the product stated on the host computer system-generated manufacturer's coupon when the consumer presents the host computer system-generated manufacturer's coupon to the manufacturer coupon redeemer at the manufacturer coupon redeemer's point-of-sale, wherein the consumer may interact directly with the manufacturer coupon redeemer, wherein the manufacturer coupon redeemer transfers its possession of a tangible product to the consumer in exchange for a consumer's currency or equity representing currency, wherein the transfer of possession of the tangible product to the consumer constitutes the consumer's ownership, wherein the consumer is not subject to any further cost to possess the tangible product, wherein the term of ownership is determined solely by the consumer, wherein the host computer system-generated manufacturer's coupon does not require the consumer to redeem the coupon at a specific manufacturer coupon redeemer, wherein the consumer may redeem the host computer system-generated manufacturer's coupon at the manufacturer coupon redeemer chosen by the consumer, wherein the host computer system-generated manufacturer's coupon may be redeemed at the manufacturer coupon redeemer who is not a member of the host computer system, wherein the host computer system-generated manufacturer's coupon may be redeemed at the manufacturer coupon redeemer who may not have any relationship with the host computer system, wherein the manufacturer coupon redeemer's redemption of the host computer system-generated manufacturer's coupon may be performed independent of the host computer system;

B. performing a coupon tracking process of the retailer's coupon that was generated by the host computer system on behalf of the retailer, subsequently distributed by the host computer system to the consumer, and subsequently provided value to the consumer by redeeming the retailer's coupon at the retailer, wherein the consumer transfers possession of the host computer system-generated retailer's coupon to the retailer, wherein the retailer, or a retailer's representative, submits the host computer system-defined consumer identification codes data printed on the redeemed host computer system-generated retailer's coupon to the database, and the submission of the data activates a host computer system process to save a record to the database, wherein the coupon tracking process comprises:

I. submitting consumer identification codes data printed on the host computer system-generated retailer's coupon to the database by an entity that possesses the redeemed coupon, comprising
   1. submitting by the retailer or the retailer's representative;
   2. submitting by the host computer system;
II. comparing data on the coupon with data retained in the database, comprising:
   1. saving submitted data where there is a successful match of the submitted host computer system-generated retailer's coupon's consumer identification codes data to consumer identification codes data retained in the database, wherein the saved data provides direct association with the consumer who originally received the coupon, wherein the saved data and direct association may be reported by:
      a. reporting the promotional data input by the retailer;
      b. reporting a ConsumerID, wherein the ConsumerID is directly associated with all data pertaining to the consumer who was assigned the ConsumerID by the host computer system;
      c. reporting the date that the host computer system-generated retailer's coupon was generated and distributed;
      d. reporting the date that the host computer system-generated retailer's coupon's consumer identification codes data was submitted to the host computer system after redemption;
      e. reporting the retailer where the consumer redeemed the host computer system-generated retailer's coupon;
   2. saving submitted data where there is an unsuccessful match, or subsequent multiple match, of consumer identification codes data to the database, wherein the saved data may be investigated for potential coupon fraud activity.

2. A method comprising the steps of:
(1) providing a host database in a host computer system comprising:
   A. retaining data for a plurality of consumers, comprising, for each consumer:
      I. retaining the consumer's personal and demographic data; and
      II. obtaining consumer data from a source, comprising at least one of:
         1. obtaining consumer data from the consumer voluntarily submitting data to the host computer system;
         2. obtaining consumer data from a manufacturer, wherein the manufacturer possesses a login account to the host computer system, 3. obtaining consumer data from a retailer, wherein the retailer possesses a login account to the host computer system; and
4. obtaining consumer data from a third-party entity wherein the third-party entity may not have a login account to the host computer system, comprising at least one of:
   a. obtaining consumer data regarding the consumer that cannot connect to a network;
   b. obtaining consumer data regarding the consumer that does not have access to a computer;
   c. obtaining consumer data regarding the consumer that has no direct relationship with the host computer system; and
   d. obtaining consumer data regarding the consumer that has no itinerary or destination;
B. retaining data for a plurality of manufacturers, wherein each manufacturer has a login account to the host computer system, wherein each manufacturer is a business that manufactures or packages tangible products intended for consumers, wherein each manufacturer produces and delivers products to a retailer that possesses an inventory of the manufacturer's products, wherein the manufacturer's products may be obtained by a consumer by purchasing the product from a retailer, and the purchase comprises the consumer receiving unencumbered ownership of the product from the retailer in exchange for the retailer's receipt of the consumer's currency or equity representing currency; and
C. retaining data for a plurality of retailers, wherein each retailer has a login account to the host computer system, wherein each retailer comprises at least one of:
   I. a business that possesses an inventory of products from a variety of manufacturers, wherein the sale of a manufacturer's product comprises the retailer providing a consumer with unencumbered ownership of the manufacturer's product in exchange for the retailer's receipt of a consumer's currency or equity representing currency;
   II. a business that provides a service for a consumer in exchange for the retailer's receipt of a consumer's currency or equity representing currency;
   III. a business that provides temporary possession of the retailer's property to a consumer in exchange for the retailer's receipt of a consumers currency or equity representing currency;

(2) providing a host website, comprising:
A. presenting interactive data entry forms for the manufacturer, wherein the manufacturer interactive data entry forms are configured to receive input from the manufacturer and subsequently save manufacturer's data into the host database, comprising:
   I. presenting manufacturer data entry forms for the manufacturer to enter data related to business operations and products of the manufacturer;
   II. presenting manufacturer data entry forms for the manufacturer to enter promotional data, wherein data submitted by the manufacturer is implemented by the host computer system to generate and distribute coupons and other promotional materials of the manufacturer; and
   III. presenting manufacturer data entry forms for the manufacturer to select criteria representing a manufacturer's targeted consumer profile, wherein the manufacturer's interaction with these forms is independent of interaction by a targeted consumer; and
B. presenting interactive data entry forms for the retailer, wherein the retailer interactive data entry forms are configured to receive input from the retailer and subsequently save retailer's data into the host database, comprising:
   I. presenting retailer data entry forms for the retailer to enter data related to the business operations, inventory, and services of the retailer;
   II. presenting retailer data entry forms for the retailer to enter promotional data, wherein data submitted by the retailer is implemented by the host computer system to generate and distribute the coupons and other promotional materials of the retailer; and
   III. presenting retailer data entry forms to allow the retailer to select criteria representing a retailer's targeted consumer profile, wherein the retailer's interaction with these forms is independent of interaction by a targeted consumer; and
C. presenting interactive data entry forms and links for the consumer, wherein the consumer interactive data entry forms and links are configured to receive and subsequently save consumer's data into the host database, wherein the forms display promotional materials from the manufacturers and retailers which may be selected by the consumer, wherein selections of the displayed promotional materials by the consumer are saved by the host database, wherein the saved selections will cause the host computer system to generate and distribute selected promotional materials to the consumer, wherein:
   I. the manufacturer's promotional materials may be distributed independent of a manufacturer's preferred consumer profile;
   II. the retailer's promotional materials may be distributed independent of a retailer's preferred consumer profile; and
   III. the selected promotional materials may be distributed independent of a consumer's profile;

(3) providing a process to convert data from the host database into promotional materials, comprising:
A. performing queries to the host database, solely by the host computer system, for each consumer in the host database, comprising:
   I. obtaining results of queries for the consumer, comprising the steps of:
      1. obtaining results, based upon the plurality of manufacturers, wherein one or more manufacturers create one or more targeted consumer profiles, wherein the consumer is targeted to be a recipient of one or more manufacturer's promotional materials, wherein the consumer is targeted independent of interaction by the targeted consumer;
      2. obtaining results, based upon the plurality of retailers, wherein one or more retailers create one or more targeted consumer profiles, wherein the consumer is targeted to be the recipient of one or more retailer's promotional materials, wherein the consumer is targeted independent of interaction by the targeted consumer; and
      3. obtaining results from the queries in the form of one or more records in the host database identifying manufacturer and retailer promotional materials selected by the consumer, wherein selected manufacturer's promotional materials may be independent of the manufacturer's preferred consumer profile, wherein selected retailer's promotional materials may be independent of the retailer's preferred consumer profile, wherein selected promotional materials may be independent of a consumer's profile;

II. sorting the results of the queries for the consumer, wherein duplicate instances of promotional materials are eliminated, III. obtaining, from the host database, all promotional material data required to generate the promotional materials for the consumer;

(4) generating promotional materials by the host computer system for the consumer on behalf of one or more manufacturer and retailer, comprising at least one of:

A. generating promotional materials with a host printer, wherein printing promotional materials includes printing consumer identification codes data that may include serial numbers, wherein the printed promotional materials are subsequently distributed to the consumer via mail or other means;

B. generating promotional materials and then subsequently distributing via email, email attachment, webpage, fax or other electronic means, wherein each promotional material includes consumer identification codes data that may include serial numbers; and (5) providing a tracking process, performed after the consumer redeems the promotional materials generated by the host computer system, comprising:

A. performing manufacturer coupon tracking on behalf of the manufacturer, wherein the host computer system generates and subsequently distributes a manufacturer's coupon to the consumer, and the manufacturer's coupon subsequently provides value to the consumer when the consumer redeems the coupon at a manufacturer coupon redeemer, wherein the consumer transfers possession of the manufacturer's coupon to the manufacturer coupon redeemer in exchange for said value, wherein the manufacturer coupon redeemer seeks reimbursement from the manufacturer for the value provided to the consumer, wherein the manufacturer coupon tracking comprises:

I. submitting consumer identification codes data, contained within the manufacturer's coupon, to the host computer system;

II. comparing, by the host computer system, the submitted consumer identification codes data to data implemented by the host computer system to generate the manufacturer's coupon; and III. saving comparison data in the host database to minimize consumer receipt of duplicate coupons, minimize coupon fraud, and assess individual purchasing habits, redemption rates, and effectiveness one or more targeted consumer profiles, IV. wherein the manufacturer coupon redeemer is a retailer that, within its business practice, redeems host-generated manufacturer's coupons presented by the consumer, and the consumer uses the manufacturer's coupon for the purpose of obtaining the value stated on the coupon; wherein the manufacturer coupon redeemer's redemption of the manufacturer's coupon is independent of the host computer system; wherein the manufacturer coupon redeemer is not required to possess a login account with the host computer system; wherein the consumer may redeem the manufacturer's coupon at a manufacturer coupon redeemer chosen by the consumer; wherein the consumer may interact directly with the manufacturer coupon redeemer; wherein the manufacturer coupon redeemer is a retailer that possesses an inventory of products from a variety of manufacturers; wherein the manufacturer coupon redeemer's primary business is selling manufacturers' products to consumers; wherein the manufacturer coupon redeemer has an inventory of the product stated on the manufacturer's coupon; wherein the consumer presents, at the manufacturer coupon redeemer, a product associated with the manufacturer's coupon along with the manufacturer's coupon; wherein the manufacturer coupon redeemer transfers its possession of the product to the consumer in exchange for the consumer's currency or equity representing currency, and the transfer of possession of the product to the consumer constitutes the consumer's ownership and the term of ownership is then determined solely by the consumer; and B. performing retailer coupon tracking on behalf of the retailer, wherein the host computer system generates and subsequently distributes a retailer's coupon to the consumer, and the retailer's coupon subsequently provides value to the consumer by redeeming the retailer's coupon at a location operated by the retailer, wherein the consumer transfers possession of the retailer's coupon to the retailer in exchange for the value provided to the consumer, wherein the retailer coupon tracking comprises:

I. submitting consumer identification codes data, contained within the retailer's coupon, to the host computer system;

II. comparing, by the host computer system, the submitted consumer identification codes data to data implemented by the host computer system to generate the retailer's coupon; and III. saving comparison data in the host database to minimize consumer receipt of duplicate coupons, minimize coupon fraud, and assess individual purchasing habits, redemption rates, and effectiveness of one or more targeted consumer profiles.

* * * * *